United States Patent [19]

Townsend

[11] 4,351,410

[45] Sep. 28, 1982

[54] SELF-BALANCING WHEELED VEHICLE

[75] Inventor: Ray T. Townsend, Des Moines, Iowa

[73] Assignee: Townsend Engineering Company, Des Moines, Iowa

[21] Appl. No.: 169,804

[22] Filed: Jul. 17, 1980

[51] Int. Cl.³ .................. B62D 9/02; B62D 61/06; B62K 5/08

[52] U.S. Cl. .................. 180/210; 280/112 A; 280/267

[58] Field of Search .......... 180/210; 280/112 A, 280/267, 269, 772, 266

[56] References Cited

U.S. PATENT DOCUMENTS

| | | | |
|---|---|---|---|
| 2,684,254 | 7/1954 | Goss | 280/112 A |
| 3,746,118 | 7/1973 | Altorfer | 280/112 A |
| 3,820,809 | 6/1974 | Blonar | 280/112 A |
| 3,958,814 | 5/1976 | Smith | 280/269 |
| 4,020,914 | 5/1977 | Trautwein | 280/112 A |
| 4,072,325 | 2/1978 | Bright et al. | 280/172 |

Primary Examiner—Richard A. Bertsch
Assistant Examiner—Donn McGiehan
Attorney, Agent, or Firm—Zarley, McKee, Thomte, Voorhees & Sease

[57] ABSTRACT

A wheeled vehicle includes a vehicle frame having at least one wheel at one end of the frame and a hinged parallelogram frame mounted on the other end of the vehicle frame and having a pair of spaced wheels mounted on opposite sides thereof. The parallelogram frame will pivot laterally in first or second opposite lateral directions when the frame leans laterally away from a position of equilibrium in the first or second lateral direction. A sensing device is connected to the vehicle frame and a power source is connected to the sensing means and parallelogram frame whereby initial leaning movement of the parallelogram frame in one direction (caused by conditions of unequilibrium) will cause the sensing device and power source to pivot the parallelogram frame in the opposite direction thereby to laterally pivot the vehicle frame to a position of equilibrium. The sensing device may be a lever pivotally connected to the vehicle frame and the power source may include a pair of extensible and retractable cylinder units for connecting opposite ends of the sensor lever to opposite sides of the parallelogram frame.

10 Claims, 15 Drawing Figures

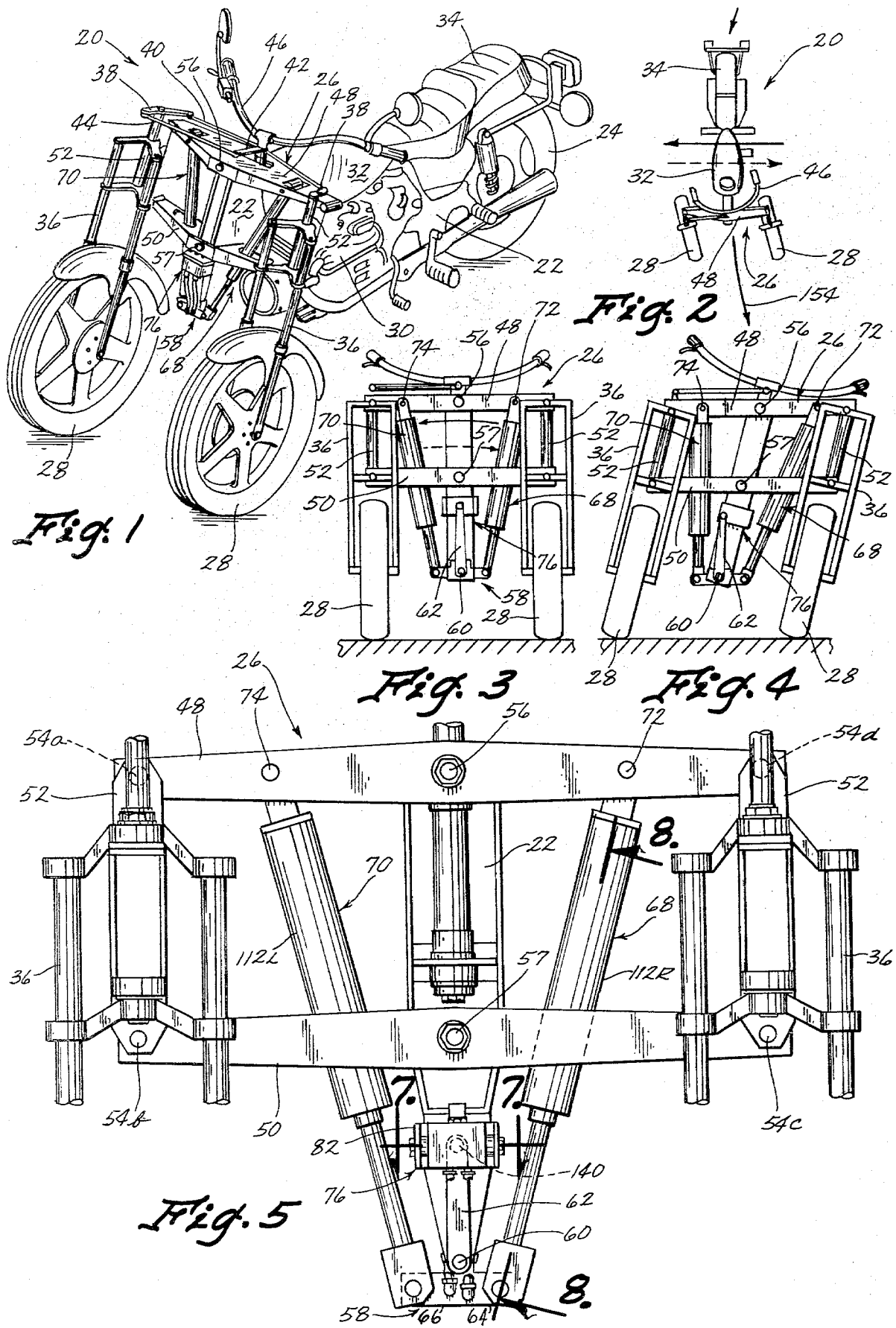

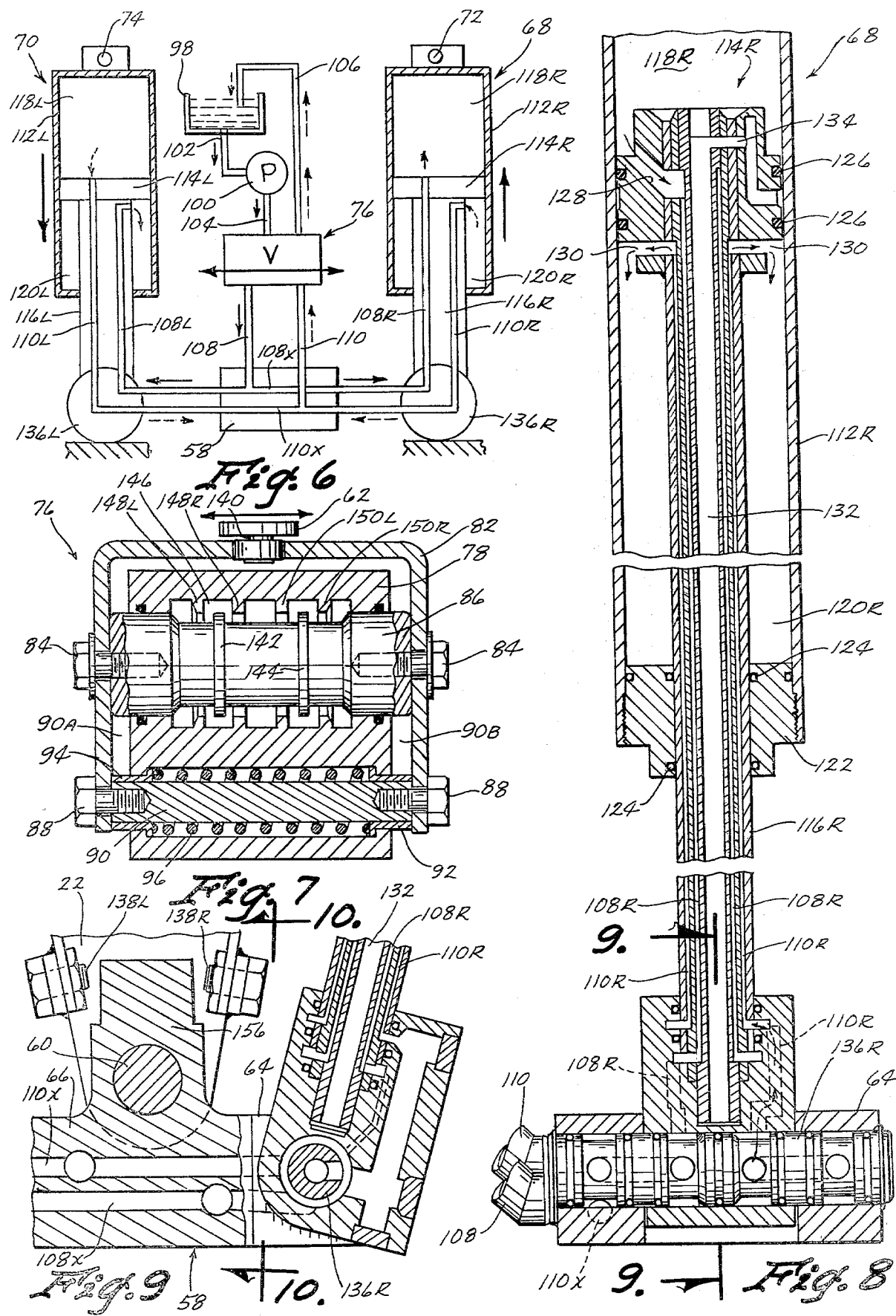

SELF-BALANCING WHEELED VEHICLE

BACKGROUND OF THE INVENTION

The present invention relates generally to wheeled vehicles and more particularly to a three-wheeled vehicle having a pair of spaced wheels mounted on a parallelogram frame for leaning movement with the frame to positions of equilibrium.

Three-wheeled pedalled vehicles having a pair of spaced wheels mounted on a parallelogram frame are known in the art although they are rarely encountered. Such vehicles generally depend on the strength of the operator to control the configuration of the parallelogram frame by means of the handlebars. Whereas manual control of the parallelogram configuration is satisfactory for light-weight pedalled vehicles, problems arise when it is desired to provide power for driving certain of the vehicle wheels. Weight is necessarily added by the engine and drive train, thereby substantially increasing the load to be controlled by the operator. One solution in the prior art was to have the operator's legs control the vehicle inclination since the legs can generate greater force than the operator's arms. Nevertheless, with the increasing speed capabilities of powered vehicles, manual control systems for the vehicle inclination are believed to be unreasonably dangerous.

Other known three-wheeled vehicles have utilized small spaced-apart wheels which remain substantially vertically inclined so that only the vehicle frame leans into turns. But such a construction does not include a parallelogram frame and is somewhat self-defeating in that it lacks a primary advantage of the parallelogram frame, namely that the resultant of all forces is at all times directed through the center of gravity of the vehicle and point of contact of the vehicle wheels with the ground. Hydraulic cylinder load-leveling systems have been devised for four-wheeled automotive vehicles but these are believed to be unsuitable for three-wheeled vehicles including a parallelogram frame because the vehicle frame response to centrifugal force and inclined road surfaces is only indirectly sensed by separate pendulum, plumb bob, or mercury capsule. Such indirect sensing means are not believed to be sufficiently reliable or responsive for maintaining the balance of a three-wheeled vehicle having a parallelogram frame.

Accordingly, a primary object of the invention is to provide an improved three-wheeled vehicle having a pair of spaced wheels mounted on a hinged parallelogram frame.

Another object is to provide an improved three-wheeled vehicle including an automatic sensing device which controls an actuator to effect the lateral inclination of the vehicle to a position of equilibrium.

Another object is to provide an improved three-wheeled vehicle including a sensor directly responsive to the balance of the vehicle itself relative to a state of equilibrium and a power unit responsive to the sensor for keeping the vehicle in balance.

Another object is to provide an improved three-wheeled vehicle including hydraulic circuitry responsive to vehicle imbalance of automatically tilting the vehicle back to a position of equilibrium without over-correcting past the equilibrium position.

Another object is to provide an improved self-balancing three-wheeled vehicle which is simple in construction and efficient and reliable in operation.

These and other objects of the invention will be apparent to those skilled in the art from the summary and description of the invention which follows.

SUMMARY OF THE INVENTION

The three-wheeled vehicle of the invention includes a vehicle frame having at least one wheel on one end of the frame and a pair of spaced wheels secured to the opposite end of the frame by hinged parallelogram frame means. A sensor on the vehicle frame is operative to detect changes in the configuration of the parallelogram frame from a position of equilibrium. The sensor then automatically controls a power means to pivot the parallelogram frame back to a position of equilibrium without over-correcting, i.e., tilting the vehicle too far in the opposite direction. The sensor may be a lever pivotally connected to the vehicle frame and operatively connected to a spool valve which is biased to a neutral position. An extensible and retractable cylinder unit is connected between the vehicle frame and parallelogram frame and in fluid communication with the spool valve for automatically adjusting the parallelogram frame as required to maintain equilibrium. The sensor lever is thus directly responsive to the vehicle itself for safely and reliably maintaining the vehicle in an equilibrium inclination.

BRIEF DESCRIPTION OF THE DRAWINGS

FIG. 1 is a perspective view of a three-wheeled vehicle of the invention.

FIG. 2 is a diagramatic top view of the three-wheeled vehicle initiating a turn.

FIG. 3 is a diagramatic front elevational view of the vehicle in a vertically inclined equilibrium state.

FIG. 4 is a diagramatic front elevational view of the three-wheeled vehicle showing the parallelogram frame being pivoted to an equilibrium position for traversing a turn.

FIG. 5 is an enlarged partial front elevational view of the vehicle showing the parallelogram frame thereof.

FIG. 6 is a schematic fluid circuit diagram for the invention.

FIG. 7 is an enlarged top sectional view of the spool valve, taken along line 7—7 in FIG. 5.

FIG. 8 is an enlarged partial side sectional view of the cylinder unit of the invention, taken along line 8—8 in FIG. 5.

FIG. 9 is a partial front sectional view of the pivotal connection between the cylinder unit and sensor lever, taken along line 9—9 in FIG. 8.

DESCRIPTION OF THE PREFERRED EMBODIMENT

Figures 10, 11:
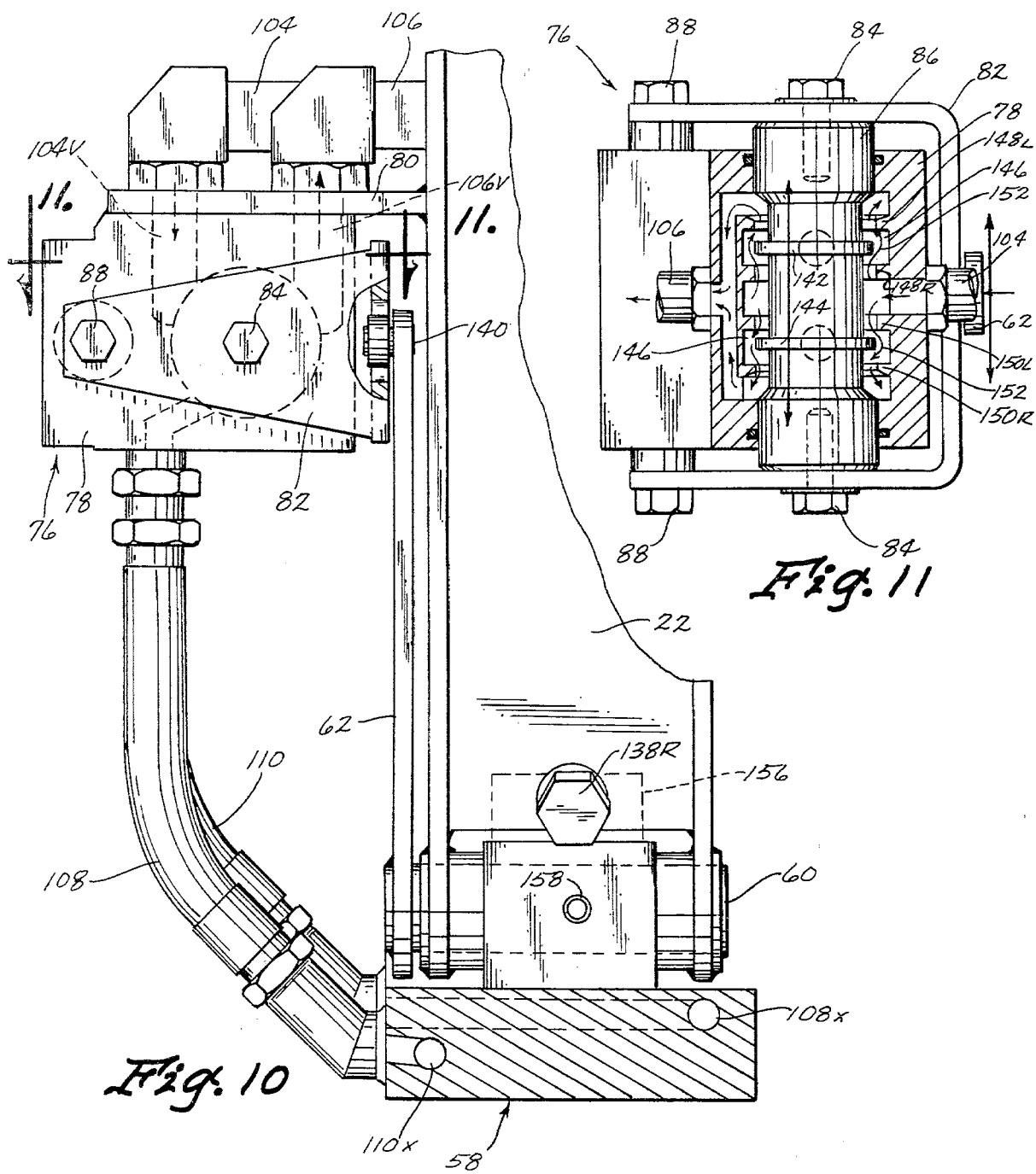
FIG. 10 is a partially sectional view of the sensor lever and spool valve of the invention, as seen on line 10—10 in FIG. 9.
FIG. 11 is a partially top view of the spool valve in the neutral position therefor, as seen on line 11—11 in FIG. 10.

The wheeled vehicle of the present invention, indicated generally at 20, includes a vehicle frame 22 having a single wheel 24 mounted on the rearward end thereof. The forward end of the vehicle frame 22 is connected to a hinged parallelogram frame 26 on which a pair of spaced-apart steerable front wheels 28 are mounted. The rearward portion of the vehicle frame 22 is similar to a conventional motorcycle in that an engine 30 is supported at a medial position below a fuel tank 32 and seat 34 for driving rear wheel 24.

Each of the front wheels 28 are mounted on similar fork structures 36 so like numerals will be used to identify like parts of each. Steering arms 38 at the top of the forks 36 are connected to one another by a tie-rod 40 and to the pivotal handlebar neck 42 by a tie-rod 44 for steering movement in unison in response to pivotal movement of the handlebar 46.

Parallelogram frame 26 includes upper crossbar 48, lower crossbar 50 and opposite side members 52 pivotally interconnecting the upper and lower crossbars 48 and 50 to form four hinged corner portions indicated at 54a, b, c, and d. The vehicle frame 22 is pivotally connected to the center of crossbars 48 and 50 at 56 and 57 and the fork structures 36 are pivotally connected to the respective side members 52 as shown best in FIGS. 1 and 5.

A generally inverted T-shaped sensor lever 58 is pivotally connected to a lower extension of vehicle frame 22 at 60. Lever 58 includes an upright valve actuator arm 62 directed perpendicularly to right and left lever end portions 64 and 66 as seen in FIG. 5. It will be apparent that the specific shape of the sensor lever 58 is not critical to the present invention and that various lever shapes and positions may be alternately suitable.

A pair of right and left extensible and retractable cylinder units 68 and 70, respectively, are pivotally connected at the lower ends to the right and left lever end portions 64 and 66, respectively, and pivotally connected at their upper ends to the parallelogram frame 26 on opposite sides of the vehicle frame 22 as indicated at 72 and 74.

The sensor lever actuator arm 62 is shown in FIG. 5 as pivotally connected to a spool valve 76 which is shown in greater detail in FIG. 7. The valve body 78 is secured relative to the vehicle frame 22 and shown in FIG. 10 by a mounting plate 80. In FIG. 7, it is seen that actuator arm 62 is pivotally connected to a yoke 82 which is secured by bolts 84 to opposite ends of a valve spool 86. The free ends of yoke 82 are connected by bolts 88 to opposite ends of a slide rod 90 which is slidably supported by right and left bearings 92 and 94 and which carries a compression spring 96 thereon for biasing the rod 90 and yoke 82 to a central position.

The clearance spaces 90A and 90B (FIGS. 7, 12 and 14) between the yoke 82 and valve body 78 are about ⅛-¼ inches in width and represent the approximate amount of maximum displacement of the valve body with respect to the yoke. Spring 96 should be approximately a ten-pound compression spring. As will be evident hereafter, the parallelogram frame 26 and the vehicle frame 22 move together as a unit, with sensor arm 62 centered thereon as shown in FIG. 3 during conditions of equilibrium. As the vehicle frame 22 and parallelogram frame tend to "fall" from the condition of equilibrium, as caused by external forces, centrifugal force, etc., the sensor arm 62 moves from its center position (FIG. 3) and the valve body 78 moves within yoke 82 as one of the spaces 90A or 90B commences to be closed (See FIGS. 12 and 14). The valve body 78 and related components sense this movement of the valve body with respect to the yoke 82, and the hydraulic circuitry including cylinder 68 and 70 act to move the parallelogram frame 26 and vehicle frame 22 back to a position of equilibrium.

Referring to the schematic fluid circuit diagram of FIG. 6, it is seen that the vehicle includes a hydraulic fluid reservoir 98 and a fluid pump 100 which is continuously operated by the vehicle engine 30. The pump is connected to the reservoir by a supply conduit 102 and to valve 76 by a supply conduit 104. A return conduit 106 extends from valve 76 to reservoir 98.

Valve 76 is operative to alternately direct pressurized fluid from supply conduit 104 to either first or second conduits 108 and 110 which each include right and left hand branches 108R, 108L and 110R and 110L. The right and left cylinder units 68 and 70 each include a cylinder body 112R and 112L, respectively, having a piston 114R and 114L, respectively, movable therein and a piston rod 116R and 116L, respectively, extended downwardly from the pistons through the lower ends of the cylinder bodies for connection to the opposite end portions 64 and 66 of sensor lever 58 as described in greater detail hereinbelow.

Each of the cylinder bodies 112R and 112L shall be described as including upper and lower chambers, referring to the interior portions of the cylinder bodies which are disposed above and below the pistons, respectively. It is seen in FIG. 6 that first conduit 108 communicates with the upper chamber 118R of right cylinder units 68 and the lower chamber 120L of left cylinder unit 70. Likewise, second conduit 110 communicates with the lower chamber 110R of right cylinder unit 68 and the upper chamber 118L of left cylinder unit 70. Accordingly, when spool valve 76 is actuated to direct pressurized fluid to first conduit 108, right cylinder unit 68 is extended and left cylinder 70 is retracted. Contrariwise, when the pressurized fluid is directed to conduit 110, right cylinder unit 68 is retracted and left cylinder unit 70 is extended.

FIG. 8 discloses in detail the structure of right cylinder unit 68, it being understood that left cylinder unit 70 is substantially the mirror image of that shown in FIG. 8. The lower end of cylinder body 112R is closed by an annular threaded plug 122 which is slidably sealed to piston rod 116R by O-ring seals 124. Piston 114R is slidably sealed within the cylinder body by piston rings 126. It is also seen in FIG. 8 that the first and second conduit branches 108R and 110R are formed as annular passages concentrically formed within piston rod 116R and which communicate with upper and lower cylinder chambers 118R and 120R through respective piston passages 128 and 130. A hollowed center 132 of piston rod 116R communicates through a piston passage 134 with the interior wall of cylinder body 112R between piston rings 126 for supplying lubricant thereto.

FIG. 8 further shows that the lower end of piston rod 116R is pivotally connected to the bifurcated right end 64 of sensor lever 58 by a rotary valve 136R which establishes permanent communication between each of the piston rod conduit branches 108R and 110R with respective passages 108X and 110X (FIG. 9) in sensor lever 58 which, in turn, are connected to conduits 108 and 110 as indicated at the bottom of FIG. 8.

FIG. 9 further discloses a pair of right and left pivot stops 138R and 138L, respectively, which are secured to the vehicle frame 22 on opposite sides of sensor lever 58 to limit pivotal movement thereof.

FIG. 10 illustrates the position of sensor lever 58 forwardly of the vehicle frame 22 and rearwardly of spool valve 76, to which it is pivotally connected at 140. FIG. 10 further discloses the communication of spool valve 76 with supply conduit 104 and return conduit 106 through respective passages 104V and 106V.

FIG. 11 illustrates spool valve 76 with the spool valve 86 disposed in a central or neutral position therein. Valve spool 86 is provided with a pair of lands 142 and 144 which are movable within valve chamber 146 for alternate engagement with annular shoulders 148R, 148L, and 150R, 150L, respectively. In the neutral position of FIG. 11, the lands 142 and 144 are disengaged from all of the valve shoulders with the result that pressurized fluid from conduit 104 simply flows axially through valve chamber 146 as indicated by arrows 152 for direct return to reservoir 98 through return conduit 106.

Figure 12:
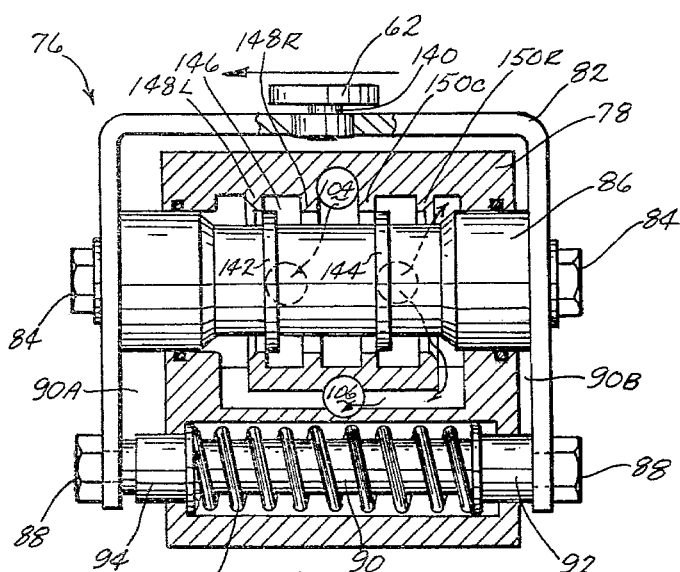
FIG. 12 is a partially sectional view of the spool valve in a first position for pivoting the parallelogram frame in one direction.
Figure 13:
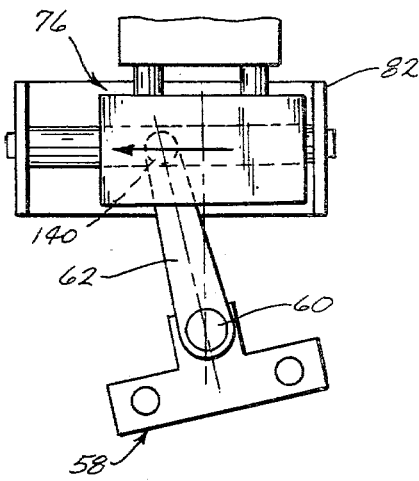
FIG. 13 is a diagramatic view of the sensor lever inclined for adjusting the spool valve to the position of FIG. 12.

FIGS. 12 and 13 illustrate the spool valve 76 with the valve spool 86 moved to a left or first position relative to valve body 78 wherein lands 142 and 144 engage shoulders 148L and 150L, respectively. In this position, a flow path is established from supply conduit 104 through conduit 110 and conduit branches 110R and 110L to the lower chamber of cylinder unit 68 and upper chamber of cylinder unit 70. Equilibrium is therefore restored by retracting cylinder unit 68 and extending cylinder 70 and inclining the parallelogram frame in a direction opposite to that shown in FIG. 4.

Figure 14:
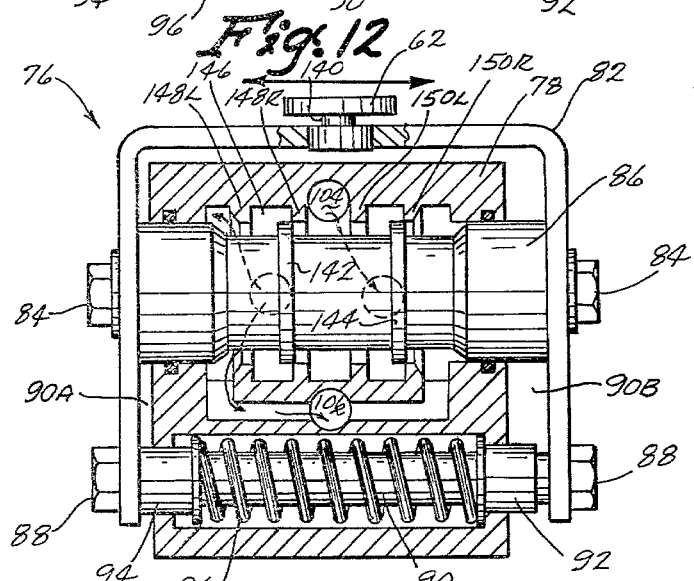
FIG. 14 is a partially sectional top view of the spool valve in a second position for pivoting the parallelogram frame in the opposite direction.
Figure 15:
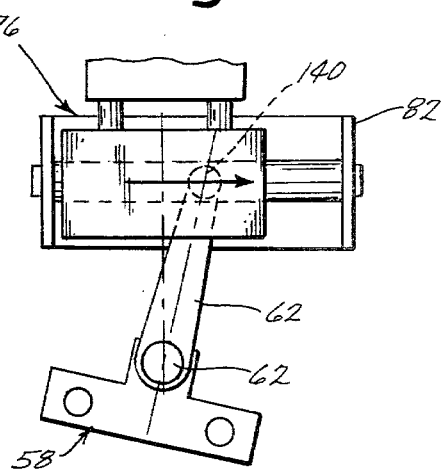
FIG. 15 is a diagramatic front view of the sensor lever inclined for adjusting the spool valve to the position of FIG. 14.

FIGS. 14 and 15 show the valve spool 86 moved to a right or second position by valve actuator arm 62 so that lands 142 and 144 engage shoulders 148R and 150R, respectively. The flow path of pressurized fluid from supply conduit 104 is then directed to first conduit 108 and through branches 108R and 108L to the upper chamber of cylinder unit 68 and lower chamber of cylinder unit 70 to extend cylinder unit 68 and retract cylinder unit 70 for pivoting the parallelogram frame to the right as indicated in FIG. 4.

In operation, the three-wheeled vehicle of the invention is controlled much like a conventional motorcycle, but with the significant advantage that this vehicle does not depend upon the operator's steering movements for the necessary weight shift to lean into turns or to compensate for inclined road surfaces and the like. Referring to FIG. 2, when the operator desires to steer the vehicle toward the right as indicated by arrow 154 in FIG. 2, he need only steer the handlebars 46 in that direction. Centrifugal force will immediately urge the vehicle and parallelogram frame to pivot to the left, i.e., in a direction opposite to that shown in FIG. 4, whereupon the normal pivotal movements of the cylinder units 68 and 70 will tend to pivot valve actuator arm 62 of sensor lever 58 to the right as shown in FIG. 15. The valve spool 86 is thus moved to the right as indicated in FIG. 14 and fluid under pressure is directed through first conduit 108 to the upper chamber of cylinder unit 68 and lower chamber of cylinder unit 70 to extend cylinder unit 68 and retract cylinder 70. Thus, the parallelogram frame 26 is pivoted in the opposite direction or rightward as indicated in FIG. 4 to lean the operator and vehicle frame 22 into the turn. Once the vehicle is inclined to the point of equilibrium for the turn that is being made, the force of compression spring 96 in spool valve 76 is operative to return the valve spool to its neutral position of FIG. 11. The parallelogram frame 26 remains in the inclined equilibrium position until the turn is completed, whereupon the operator straightens the forward wheels 28. The natural response of the parallelogram frame is to pivot further to the right under the influence of gravity but the initial rightward pivotal movement of the parallelogram frame pivots the sensor lever 58 to the left as indicated in FIG. 13, thereby actuating spool valve 76 to direct pressurized fluid through second conduit 110 to retract cylinder unit 68 and extend cylinder unit 70, thereby righting the parallelogram frame to the equilibrium position of FIG. 3 for straight ahead motion.

It will be apparent that the response of the vehicle will be just the opposite of that described above when traversing a turn in a direction opposite to that of arrow 154 in FIG. 2. Likewise, when an uneven road surface is encountered such as when driving across an inclined surface, gravity rather than centrifugal force will initiate the same type of corrective movement of the parallelogram frame which is described above to automatically adjust the configuration of the parallelogram to a position of equilibrium.

Accordingly, the operator need only be concerned with steering movements of the vehicle since the function of maintaining the balance of the vehicle is automatically accomplished by the sensor and power means of the invention. Operation of the vehicle therefore does not depend on the relative strength of the operator and even a heavy vehicle constructed with a large engine may be safely operated by even a small operator who would be unable to manually control the inclination of such a vehicle. Since the return spring in spool valve 76 constantly biases the valve spool to the neutral or equilibrium position therefor, there is no danger that the vehicle will over-correct when negotiating turns and inclined surfaces.

Whereas sensor lever 58 has an inverted T-shape configuration when viewed from the front, it is apparent in the side view of FIG. 10 that the horizontal lower portion of sensor lever 58 includes an upstanding block portion 156 which is fixed to shaft 60 by a set screw 158 and that the actuator arm 62 is fixed to a forward portion of shaft 60 for pivotal movement in unison with the remainder of lever 58. It is the upstanding block portion 156 which engages stops 138R and 138L, to limit pivotal movement of sensor lever 58.

What is claimed is:

1. A wheeled vehicle, comprising,
a vehicle frame having opposite ends,
wheel means on one end of said frame,
a hinged parallelogram frame means having four hinged corner portions pivotally mounted on the other end of said frame, and being adapted for pivotal movement in opposite directions,
a pair of spaced wheels secured to said parallelogram frame means at opposite sides thereof, whereby said parallelogram frame means will pivot laterally in first and second opposite lateral directions when said frame leans laterally away from a position of equilibrium in said first and second lateral directions, respectively,
sensing means operatively connected to said parallelogram frame means, and adapted to be actuated by said parallelogram frame means when said frame leans away from a position of equilibrium whereby the inbalance of said frame away from a position of equilibrium actuates said sensing means, and power means connected to said sensing means and said parallelogram frame means whereby the initial pivotal movement of said parallelogram frame means from a position of equilibrium in one of said lateral directions will automatically cause said sensing means to actuate said power means to move said parallelogram frame means in the opposite lateral direction to cause said vehicle frame to move laterally to a position of equilibrium, said sensing means comprising a lever pivotally connected to said vehicle frame, and said power means includes an extensible and retractable cylinder means connected at one end to said lever and connected at the opposite end to said parallelogram frame means whereby said lever is pivoted in opposite directions with respect to said vehicle frame in response to leaning movement of said parallelogram frame means in said first and second opposite lateral directions, respectively, from a position of equilibrium.

2. The wheeled vehicle of claim 1 wherein said power means further comprises a valve having a spool movable between first, neutral and second positions, one of said valve and spool being fixed relative to said vehicle frame and the other of said value and spool being operatively connected to said lever for movement therewith.

3. The wheeled vehicle of claim 2 further comprising a fluid reservoir and source of fluid under pressure, both in fluid communication with said valve, said valve also being in fluid communication with opposite ends of said cylinder unit for directing fluid under pressure from said source to said opposite ends in response to movement of said spool to said first and second positions, respectively.

4. The wheeled vehicle of claim 3 further comprising bias means on said valve for urging said spool to the neutral position therefor, said valve, in the neutral position, being operative to establish fluid communication between said source of fluid and reservoir independently of said cylinder unit.

5. The wheeled vehicle of claim 1 wherein said power means includes a pair of extensible and retractable cylinder units having first ends connected to opposite ends of said lever and opposite ends connected to said parallelogram frame means on opposite sides of said vehicle frame.

6. The wheeled vehicle of claim 3 wherein said cylinder unit comprises an elongated cylinder, a piston movably supported therein and a piston rod connected to said piston and extended outwardly of said cylinder, said piston and piston rod including a pair of fluid passages therethrough which communicate at one end with said cylinder on opposite sides of said piston and which communicate at the opposite ends with said valve.

7. The wheeled vehicle of claim 1 wherein said vehicle frame and pair of spaced wheels are connected to said parallelogram frame means in parallel relation to one another for leaning movement in unison.

8. The wheeled vehicle of claim 7 wherein said pair of spaced wheels are steerably secured to said parallelogram frame means and further comprising means for steering said spaced wheels in unison.

9. The wheeled vehicle of claim 1 wherein said hinged parallelogram frame means is mounted on the front end of said vehicle frame.

10. The wheeled vehicle of claim 1 further comprising power drive means on said vehicle frame and means for drivingly connecting said power drive means to said wheel means.

* * * * *